US009116798B2

(12) United States Patent (10) Patent No.: US 9,116,798 B2
Daynes et al. (45) Date of Patent: Aug. 25, 2015

(54) OPTIMIZED MEMORY MANAGEMENT FOR CLASS METADATA

(75) Inventors: Laurent Phillipe Daynes, Saint-Ismier (FR); Thomas Schatzl, Linz (AT)

(73) Assignee: Oracle International Corporation, Redwood Shores, CA (US)

( * ) Notice: Subject to any disclaimer, the term of this patent is extended or adjusted under 35 U.S.C. 154(b) by 297 days.

(21) Appl. No.: 13/308,380

(22) Filed: Nov. 30, 2011

(65) Prior Publication Data

US 2013/0138703 A1 May 30, 2013

(51) Int. Cl.
*G06F 7/00* (2006.01)
*G06F 12/02* (2006.01)
*G06F 9/445* (2006.01)
*G06F 17/00* (2006.01)

(52) U.S. Cl.
CPC ........ *G06F 12/0253* (2013.01); *G06F 9/44521* (2013.01); *G06F 9/44589* (2013.01)

(58) Field of Classification Search
None
See application file for complete search history.

(56) References Cited

U.S. PATENT DOCUMENTS

| | | | | |
|---|---|---|---|---|
| 7,620,943 B1 * | 11/2009 | Garthwaite | .................... | 717/140 |
| 2002/0129177 A1 * | 9/2002 | McGuire et al. | .............. | 709/315 |
| 2005/0172278 A1 * | 8/2005 | Kuch et al. | .................... | 717/158 |

OTHER PUBLICATIONS

Thomas Schatzl, Laurent Daynès, Hanspeter Mössenböck, "Optimized Memory Management for Class Metadata in a JVN", Aug. 24, 2011, PPPJ '11 Proceedings of the 9th International Conference on Principles and Practice of Programming in Java, pp. 151-160.*
Etienne M. Gagnon and Laurie J. Hendren. Sable VM: A Research Framework for the Efficient Execution of Java Bytecode. Sable Technical Report No. 2000-3, Nov. 1, 2000.
Martin T. Vechev and Peter D. Petrov. Class Unloading with a Concurrent Garbage Colletor in an Embedded Java VM. pp. 99-108, Jun. 23, 2003.

* cited by examiner

*Primary Examiner* — Usmaan Saeed
*Assistant Examiner* — Yu Zhao
(74) *Attorney, Agent, or Firm* — Osha • Liang LLP (57) ABSTRACT

A method for managing class metadata in a garbage collected system, including (i) allocating a metaspace to a class loader of a mutator using a memory heap, where the metaspace is configured to store the class metadata generated by the class loader, (ii) storing, in the metaspace, class metadata items associated with classes defined by the class loader, where the class metadata items and the class loader are coterminous, and where all of the class metadata items are identified by a garbage collector as live if any of the class metadata items is reachable by the mutator, (iii) updating a linkset graph during resolution of symbolic links to sumarize cross-metaspace references, and (iv) reclaiming, by the garbage collector based on a pre-determined algorithm using the metaspace, memory locations unreachable by the mutator, where all memory locations allocated to the class metadata items are reclaimed together as a group.

16 Claims, 6 Drawing Sheets

OPTIMIZED MEMORY MANAGEMENT FOR CLASS METADATA

BACKGROUND

Modern systems supporting object-oriented programming typically allocate objects from a region of memory called the memory heap, which may also be referred to as the heap. Heap-allocated objects may comprise references to others heap-allocated object. The resulting interconnected set of objects forms an object graph. A heap-allocated object is said alive if it is reachable from a root set of references, which typically comprises references stored in global variables, registers, or the call stack of the threads of the program. When an object of the heap becomes unreachable because all paths from the root set to the object have been removed, the object can no longer be used. However, the object continues to occupy memory space in the memory heap.

Garbage collection is a process that reclaims this unused memory space and makes it available to accommodate new objects. Generally, garbage collectors trace references of the object graph, starting from the root set, to automatically obtain global knowledge of unused memory space in a methodical way. The part of the program that does useful work, distinguished from that which does the garbage collection, is referred to as "mutator." From the garbage collector's point of view, the mutator mutates the live part of the object graph, i.e., the part of the object graph that is reachable from the root set.

Most modern trace-based garbage collectors implement some variant of the tri-color marking abstraction, which works as follows. Every heap objects is colored in black, grey or white, thus dividing the heap into three sets. The white set is all the objects that have not been visited and are candidates for having their memory recycled. The black set is all the objects that have been traced and that have no references to objects in the white set; in many implementations the black set starts off empty. The grey set is all the objects that are immediately reachable from live references (i.e., references from the root set or from black objects), but whose references to other objects haven't been inspected yet by the tracing algorithm. In particular, grey objects may reference white objects. The tracing algorithm works by moving objects from the white set to the grey set to the black set, but never in the other direction, as follows.

Tracing the object graph begins with initializing the grey set with all objects referenced directly from references in the root set; all other objects are initially placed in the white set, and the black set is empty. Following this initial step, the second step is to pick an object from the grey set and blacken this object (i.e., move it to the black set) by graying all the white objects it references directly (i.e., move them to the grey set). This step confirms that this object cannot be garbage collected, and also that any objects it references cannot be garbage collected. The second step is repeated until the grey set is empty. When the grey set is empty, all live objects have been identified and are colored black, all the objects remaining in the white set have been demonstrated not to be reachable, and the storage occupied by them can be reclaimed.

Using the tri-color marking abstraction, every object of the object graph belongs to precisely one set. The tri-color marking algorithm preserves an important invariant that states no black object points directly to a white object. This process ensures that the white objects can be safely destroyed once the grey set is empty.

The Java™ platform offers a rich set of features, such as programmable class loading, dynamic linking, reflection, and execution from an architecture-neutral binary form. These features require Java™ Virtual Machine (JVM) implementations to maintain sophisticated data structures describing classes in memory during program execution. These data structures, called class metadata, mirror information encoded in class files as well as additional runtime information needed by various components of a JVM, and in particular, the garbage collector. Class metadata for a single class type comprises several objects that may reference class metadata describing other class types defined by the same or by different class loaders. For example, the virtual table embedded in the class descriptor of one class type may comprise references to metadata describing methods of other class types. Similarly, the constant pool of a class type may include references to metadata describing fields and methods of other classes.

Garbage collectors require intimate knowledge of class metadata, both for collecting the memory heap and for class unloading. Unloading a class comprises freeing memory resources allocated to class metadata that describes the class being unloaded. Class metadata provides the garbage collector with precise locations of references in class instances. They may also hold references to memory heap objects via static variables, or via direct references to the reflection objects that represent themselves (e.g., instances of java.lang.Class). In some cases, class metadata may hold the only path to certain memory heap objects. They may themselves be reachable only from other class metadata, or only from memory heap-allocated objects. Hence, the garbage collector needs to trace class metadata.

For these reasons, it is common for JVM implementations to lay out class metadata in the same way as Java memory heap objects in order to unify their processing during garbage collection. In some cases, like in JVMs implemented in Java, class metadata are Java objects allocated directly in the memory heap. Since class metadata is typically long-lived, JVMs equipped with generational garbage collection often pre-tenure class metadata or store them in a special memory heap area such as the permanent generation of the Java HotSpot™ Virtual Machine (HotSpot VM).

Class metadata consumes a large amount of memory. This consumption issue has prompted several efforts to share the class metadata across applications in multi-tasking environments. A multi-tasking virtual machine (MVM) is an implementation of the JVM capable of running multiple application programs in isolation in a single address space. An MVM may share class metadata across specific class loaders of different tasks while providing tasks with isolated heaps. Specifically, tasks allocate objects in a task-private heap that may be garbage collected independently of other tasks private heaps.

Transparent sharing of class metadata across tasks in a MVM exploits knowledge of the linkset that class loaders can produce. A class loader resolves a symbolic reference (i.e., a class name) to a class type, either by defining itself this class type, or by delegating the resolution of the symbolic reference to another class loader.

Class types are defined from class files, which are binary representation of classes. Each class type is described using class metadata constructed by the JVM from a class file provided by the defining class loader.

The set of all the class files used to define all the possible class types that a class loader can resolve from symbolic references is called the linkset of the class loader. Thus, the linkset produced by a class loader includes both the class files for the class types that the class loader defines, but also the class types defined by other class loaders to which the class loader delegates link resolutions to. It is possible for two class loaders to produce the same linkset. For example, two class loaders that don't delegate to any other class loaders and that define class types from the same jar file produce the same linkset.

Another example is when two class loaders that define class types from the same jar file also delegate to a same third class loader. An MVM may transparently and automatically share the class metadata for class types defined by two class loaders if these produce the same linkset.

Memory management for class metadata contributes substantially to garbage collection costs. In particular, full collections must determine what classes are alive in order to determine the liveness of objects referenced from class metadata only and to decide what class may be unloaded. This determination requires garbage collectors to trace all cross-metadata references, which is often more expensive that tracing the application heap. Running multiple applications in a MVM capable of transparently sharing class metadata across tasks aggravates these costs and makes it difficult to reclaim the memory of classes unloaded by one task independently of others.

SUMMARY

In general, in one aspect, the invention relates to a method for managing class metadata in a garbage collected system. The method includes (i) allocating a first metaspace to a first class loader of a mutator executing on a processor using a memory heap, wherein the first metaspace is configured to store a first plurality of class metadata items generated by the first class loader, (ii) storing, in the first metaspace, a first plurality of class metadata items associated with a first plurality of classes defined by the first class loader, wherein the first plurality of class metadata items and the first class loader are coterminous, and wherein all of the first plurality of class metadata items are identified by a garbage collector as live if any of the first plurality of class metadata items is reachable by the mutator, (iii) updating a linkset graph during resolution of symbolic links to summarize cross-metaspace references, and (iv) reclaiming, by the garbage collector executing on the processor based on a pre-determined algorithm using the first metaspace, a plurality of memory locations unreachable by the mutator, wherein all of the plurality of memory locations allocated to the first plurality of class metadata items are reclaimed together as a group.

In general, in one aspect, the invention relates to a system including a processor, a memory heap within which memory locations unreachable by a mutator executing on the processor using the memory heap are reclaimed by a garbage collector, and a first metaspace allocated to a first class loader of the mutator, wherein the first metaspace is configured to store a first plurality of class metadata items generated by the first class loader, wherein the first plurality of class metadata items and the first class loader are coterminous, wherein all of the first plurality of class metadata items are identified by a garbage collector as live if any of the first plurality of class metadata items is reachable by the mutator, and wherein a linkset graph is updated during resolution of symbolic links to summarize cross-metaspace references, and wherein the garbage collector executes on the processor and is configured to reclaim, based on a pre-determined algorithm using the first metaspace, a plurality of memory locations unreachable by the mutator, wherein all of the plurality of memory locations allocated to the first plurality of class metadata items are reclaimed together as a group.

In general, in one aspect, the invention relates to a non-transitory computer readable medium, embodying instructions executable by a processor to perform method steps for managing class metadata in a garbage collected system. The instructions comprising functionality to (i) allocate a first metaspace to a first class loader of a mutator executing on a processor using a memory heap, wherein the first metaspace is configured to store the class metadata generated by the first class loader, (ii) store, in the first metaspace, a first plurality of class metadata items associated with a first plurality of classes defined by the first class loader, wherein the first plurality of class metadata items and the first class loader are coterminous, and wherein all of the first plurality of class metadata items are identified by a garbage collector as live if any of the first plurality of class metadata items is reachable by the mutator, (iii) updating a linkset graph during resolution of symbolic links to summarize cross-metaspace references, and (iv) reclaiming, by the garbage collector executing on the processor based on a pre-determined algorithm using the first metaspace, a plurality of memory locations unreachable by the mutator, wherein all of the plurality of memory locations allocated to the first plurality of class metadata items are reclaimed together as a group.

Other aspects of the invention will be apparent from the following description and the appended claims.

DETAILED DESCRIPTION

An example of the invention will now be described in detail with reference to the accompanying figures. Like elements in the various figures are denoted by like reference numerals for consistency.

In examples of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a novel memory management approach for class metadata that combines storing class metadata in metaspaces for fast reclamation and maintaining a linkset graph to substantially reduce the number of references that a trace-based garbage collector needs to trace in order to determine what classes are alive and what objects are reachable from the class metadata representing these classes. In particular, this novel memory management approach for class metadata exploits the Java language specification with respect to class unloading, which states that both classes and interfaces have the same lifetime as their class loaders. Said in other words, classes, interfaces, and their class loaders are coterminous. Therefore, a class and/or an interface should only be unloaded when their class loader is unreachable.

In one or more embodiments, metaspaces are configured to store class metadata segregated by the linkset of their class loader and to keep exact record of references from class metadata to the memory heap. In addition, the linkset graph is used to keep track of metaspaces that reference other metaspaces via resolved symbolic links. Accordingly, metaspaces allow en masse reclamation of the storage allocated to classes defined by a class loader when this class loader becomes unreachable. In such embodiments, the linkset graph eliminates the need to trace references between metadata items to determine the liveness of classes and of the memory heap objects they refer to.

In one or more embodiments, this metaspace-based management of class metadata is extended to multi-tasking implementations of the JVM that can share class metadata across tasks. The metaspace-based management enables tasks to unload classes independently of other tasks. It also improves full collection time by limiting tracing of class metadata to the subset of the linkset graph relevant to the task.

Figure 1:
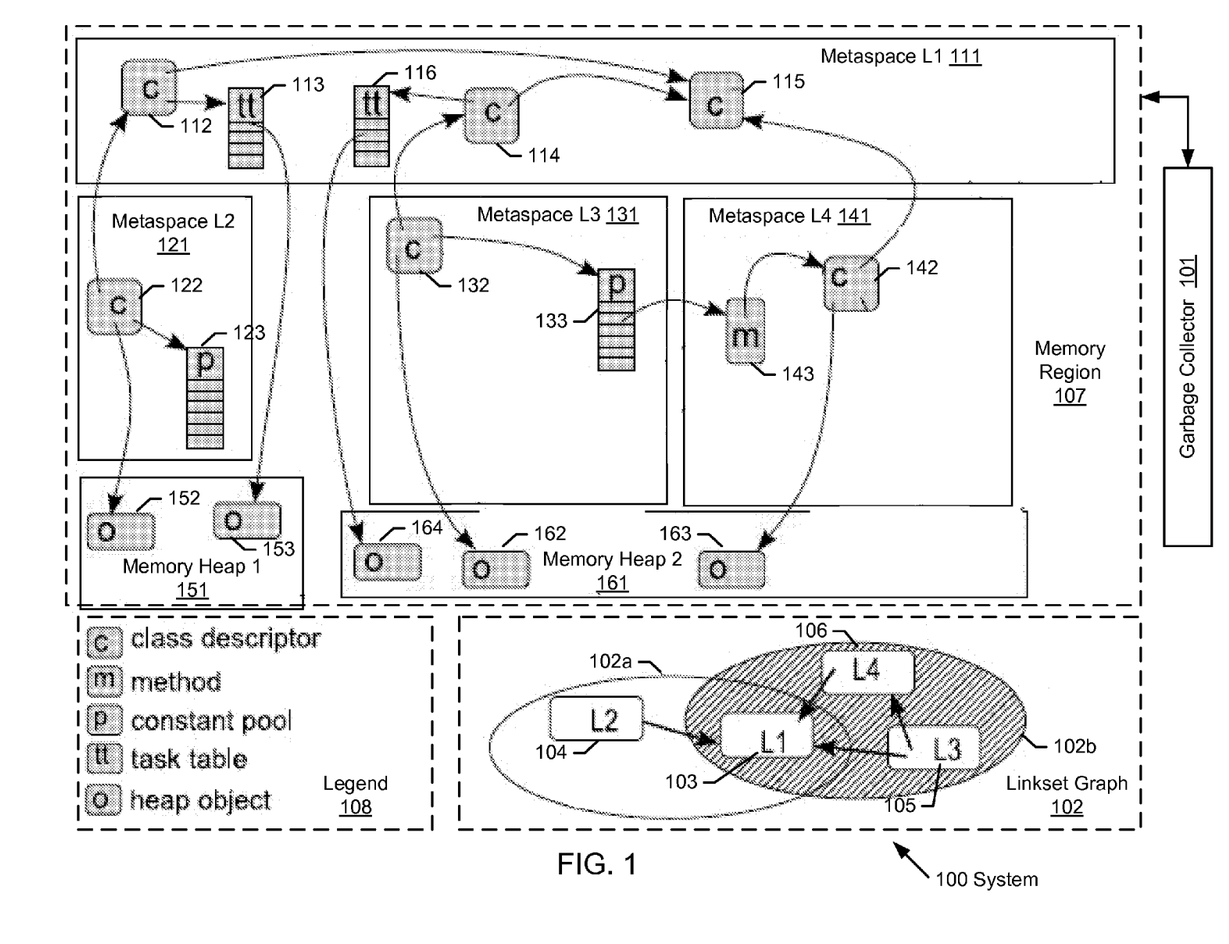
FIG. 1 shows a schematic diagram of a system in accordance with one or more embodiments of the invention.

FIG. 1 shows a schematic diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes garbage collector (101), memory region (107), and linkset graph (102). The memory region (107) is shown as an overview of how class metadata references each other and references objects in the memory heaps. FIG. 1 also illustrates the different representation of class metadata, depending on whether the metadata is shareable across tasks (e.g., the former uses a task table, the latter doesn't). Various types of class metadata and objects are identified in FIG. 1 based on the legend (108) while references between metadata and objects are represented as arrows.

In one or more embodiments, the memory region (107) is a virtual memory region and is for a multi-tasking JVM running two tasks, each with its own memory heap (i.e., memory heap 1 (151) and memory heap 2 (161)). Only a subset of the data structures for class types are depicted in FIG. 1 for simplicity. Specifically, the memory region (107) includes metaspaces L1 through L4 (111, 121, 131, 141), memory heap 1 (151), and memory heap 2 (161). The metaspaces L1 through L4 (111, 121, 131, 141) store allocated class metadata, such as metadata (112-116), metadata (122-123), metadata (132-133), and metadata (142-143) that are generated by respective class loaders (not shown). The memory heap 1 (151) and memory heap 2 (152) store allocated objects (e.g., objects (152-153) and objects (162-164)).

In one or more embodiments, all metadata (e.g., metadata (112-116)) that describe class types defined by the same class loader (not shown) are allocated in the same metaspace (e.g., metaspace L1 (111)). As noted above, this allocations scheme simplifies memory management in two ways. First, space reclamation within a metaspace is no longer necessary because all objects in the metaspace have the same lifetime. Second, memory of all class types defined by a specific loader can be reclaimed en masse when this loader becomes unreachable, by releasing the memory locations in its metaspace instead of releasing the individual memory location allocated to each of the class metadata items describing classes defined by the unreachable loader In the example shown in FIG. 1, each task runs an application with its own class loaders. Each class loader (not shown here) carries a linkset identifier that identifies the linkset that the class loader produces. Throughout this disclosure, the terms "linkset" and "linkset identifier" are used interchangeably. The linkset identifier of a class loader is assigned by the JVM the first time a class loader is used for a class definition or a link resolution operation. When executing in a multi-tasking JVM, the class loader may be assigned a linkset identifier already used by other class loaders that produce the same linkset. When a new linkset is created, it is entered in a list tracking all linksets used by class loaders. When executing in a multi-tasking JVM, there is one such list per task. In the example shown in FIG. 1, the linksets L1 through L4 (103,104, 105, 106) are paired with metaspaces L1 through L4 (111, 121, 131, 141), respectively. In particular, class loaders known to produce the same linkset may share class metadata. When sharing is possible, these class loaders are paired with the same linkset, and therefore, use the same metaspace. In the example shown in FIG. 1, metaspace L1 (111) is shared across tasks.

In one or more embodiments, the linksets forms the nodes of the linkset graph (102) for the multi-tasking JVM running the aforementioned two tasks. Each task is associated with a subgraph (e.g., subgraph (102a), subgraph (102b)) of the linkset graph (102). The subgraph for a task comprises the linksets of the class loaders used by the task. As shown, the linkset graph (102) includes directed edges among the metaspaces L1 through L4 (111, 121, 131, 141). A directed edge from a linkset L2 (104) to another a linkset L1 (103) indicates that symbolic references from class metadata (122) in metaspace L2 (121) was resolved to class metadata (112) in metaspace L1 (111).

References created between class metadata objects (e.g., metadata (112-116), metadata (122-123), metadata (132-133), metadata (142-143)) reflect link resolution decisions. Once taken by a class loader, these decisions remain valid for the lifetime of the class loader. Since all classes defined by the same class loader have the same lifetime, any reference from one metaspace to another weighs the same in terms of reachability: i.e., all class data in a metaspace are live if any of them is reachable. In one or more embodiments, this information is summarized in the linkset graph (102), which is built incrementally during class link resolution. The linkset graph (102) has one vertex (i.e., node) per linkset (e.g., linkset L1 (103)), and a directed edge (represented by straight arrows in the linkset graph (102)) between two vertices linkset L1 (103) and linkset L2 (104) if at least one symbolic link (represented by curved arrows in memory region (107)) from a corresponding metaspace L 1 (111) resolves to a class type in another corresponding metaspace L2 (121). In other words, the linkset graph (102) records which metaspaces are reachable from others via resolved symbolic links.

Each metaspace (e.g., one of metaspaces L1 through L4 (111, 121, 131, 141)) also keeps track of its references to the application memory heap (e.g., memory heap 1 (151), memory heap 2 (161)). This information, combined with the linkset graph (102), allows the garbage collector (101) to determine the liveness of classes, class loaders (not shown), and memory heap objects (e.g., memory heap objects (152-153), memory heap objects (162-164)) without tracing all class metadata (e.g., those identified based on the legend (108)). In one or more embodiments, the garbage collector (101) is configured to trace the linkset graph (102) and follows references from live metaspaces (e.g., metaspaces L1 through L4 (111, 121, 131, 141)) to the application memory heap (e.g., memory heap 1 (151), memory heap 2 (161)). This makes the costs of tracing metadata a function of the number of linksets (e.g., linksets L1 through L4 (103-106)) and edges in the linkset graph (102) instead of a function of the number of metadata objects (e.g., those identified based on the legend (108)) and references between them. Accordingly, the number of references that have to be traced during full collections is reduced substantially. The number of class loaders that an application uses is typically negligible compared to the total number of references in class metadata.

Figure 2A:
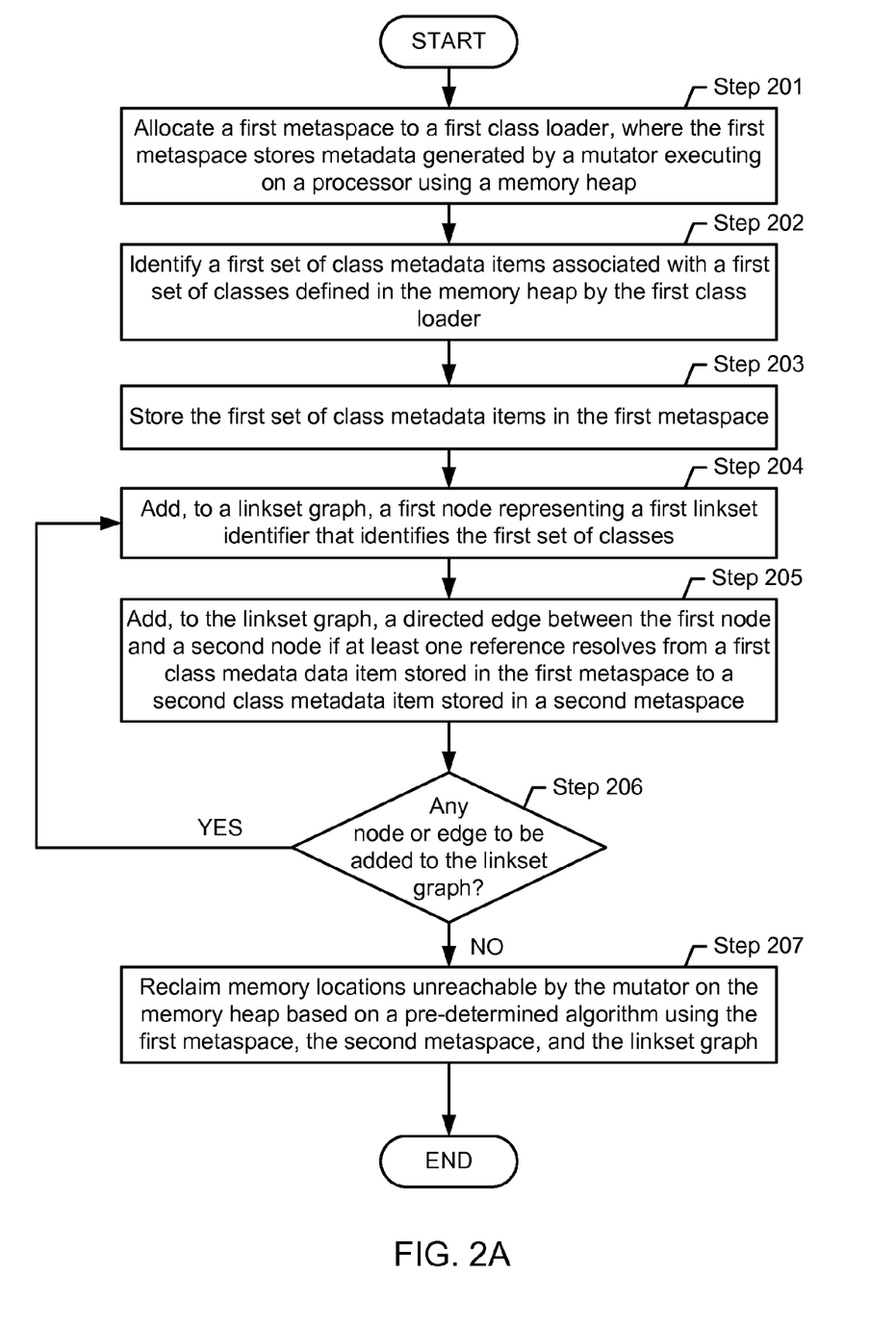
FIGS. 2A and 2B show a flow chart of a method in accordance with one or more embodiments of the invention.

FIG. 2A depicts a flowchart of a method in accordance with one or more embodiments of the invention. In one or more embodiments of the invention, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method described in reference to FIG. 2A may be practiced using the system (100) described in reference to FIG. 1 above. In one or more embodiments, the method depicted in FIG. 2A may be used to manage memory for class metadata and performing garbage collection on a memory heap, such as one or more of the memory heaps depicted in FIG. 1 above.

Initially, in Step 201, a first metaspace is allocated to a first class loader. For example, the class loader may be a class loader of a mutator (e.g., in a JVM or MVM) and the first metaspace may be allocated in a virtual memory region. In particular, the first metaspace may be configured to store metadata generated by the first class loader.

In Step 202, a first set of class metadata items is identified that are associated with a first set of classes defined in the memory heap by the first class loader. Specifically, each of the first set of class metadata items is generated for a corresponding class in the first set of classes. For example, a class metadata item may be generated when the corresponding class is defined by the first class loader. In one or more embodiments, the first set of class metadata items and the first class loader are coterminous, i.e., they have the same lifetime. As a result, all class metadata items in the first set are considered alive by the garbage collector if any of the class metadata items in the first set is reachable by the mutator. In the example of JVM or MVM, such coterminous property is based on the JAVA language specification.

In Step 203, the first set of class metadata items are stored in the first metaspace. In one or more embodiments, each class metadata item in the first set is stored in the first metaspace as it is generated. Said in other words, the first set of class metadata items are stored in the first metaspace incrementally as each class metadata is generated. In one or more embodiments, as part of the garbage collection process, when the garbage collector has determined that the first class loader is unreachable by the mutator, the space occupied by all metadata items of the first set of class metadata items can be reclaimed. Reclaiming the space occupied by all metadata items of the first set of class metadata items is facilitated since they it is allocated only from the first metaspace, whose memory can be freed at once.

As noted above, determining unreachable class loaders is facilitated by constructing a linkset graph that includes node corresponding to metaspaces and directed edges indicating the presence of at least one reference among the metaspaces. The method of constructing the linkset graph is described below.

In Step 204, a first node representing a first linkset identifier associated with the first class loader is added to the linkset graph. In one or more embodiments, the first linkset identifier identifies the first set of classes. Accordingly, the first linkset identifier also identified the first set of class metadata items.

In Step 205, a directed edge is added to the linkset graph between the first node and a second node. In one or more embodiments, such directed edge is added in response to determining that at least one reference resolves from one of the first set of class metadata items to another class metadata item stored in a second metaspace represented by the second node. Specifically, this second class metadata item is generated by a second class loader for a corresponding second class. All class metadata generated by the second class loader are stored in the second metaspace.

In Step 206, a determination is made as to whether there are any more nodes or edges that can be added to the linkset graph. In one or more embodiments, defining a new class type or resolving a symbolic reference with a class loader whose linkset isn't already in the linkset graph determines that a node must be added to the linkset graph. Further, resolving symbolic refererences across class loader boundaries determines that a new edge may be added to the linkset graph. If the determination is yes, then the method returns to Step 204. If the determination is no, then the method proceeds to Step 207.

In Step 207, memory locations unreachable by the mutator on the memory heap are reclaimed by the garbage collector based on a pre-determined algorithm using the first metaspace, the second metaspace, and the linkset graph. Further, the memory allocated to metaspaces determined unreachable by the garbage collector is reclaimed. Specifically, the pre-determined algorithm (i) determine live heap memory locations and live linksets using the first metaspace, the second metaspace, and the linkset graph based on a variation of the aforementioned tri-color marking scheme and (ii) reclaims unreachable heap memory locations using space reclamation techniques known to those skilled in the art (e.g., reorganization of free space into segregated lists, or compaction techniques). In one or more embodiments, the liveness of metaspaces is determined by traversing successors in the linkset graph of linksets that (i) are directly reachable from live heap memory locations (e.g., a linkset whose identifier is stored in a live class loader), or (ii) corresponds to metaspaces that store at least one class metadata item directly reachable from live heap memory locations (e.g., class descriptors stored in the header or in a field of a live heap memory object). Accordingly, when the marking phase of the pre-determined garbage collector algorithm has completed, the memory of metaspaces corresponding to linksets that are still unreachable is reclaimed.

In one or more embodiments, traversing the linkset graph eliminates the need to trace all class metadata items for identifying unreachable metadata items. More details of such en masse memory reclamation using the metaspace and linkset graph is described in reference to FIG. 4 and the corresponding example below.

As noted above, the method depicted in FIG. 2A may be extended to multi-tasking environments where tasks may unload classes independent of other tasks. The garbage collection time is improved by limiting tracing of class metadata items to a subset of the linkset graph that is relevant to the task that is unloading a class. For example, the aforementioned memory heap may include a first heap and a second heap used by a first application a second application, respectively. The first application and the second application may share the first class loader and the first metaspace while the second class loader and the second metaspace are used by only one of the applications.

Further, the method depicted in FIG. 2A may be applied to a number of operations performed during the execution of an objected oriented software program, such as a Java™ program. Such operations include (i) creating a class loader, (ii) creating a new class type, (iii) resolving a symbolic link, and (iv) performing a full collection. An example method of this application is described in reference to FIG. 2B below.

Figure 2B:
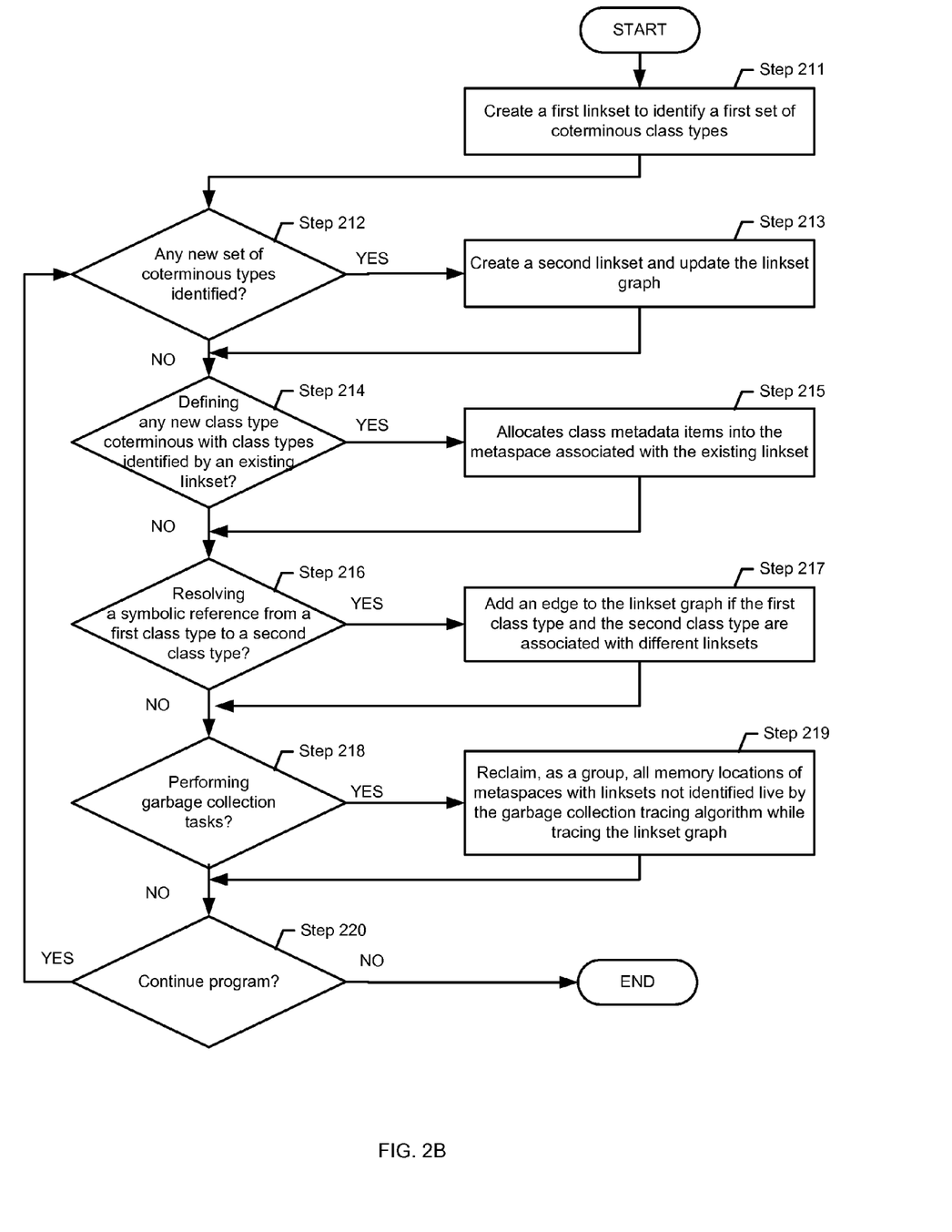

FIG. 2B depicts a flowchart of a method in accordance with one or more embodiments of the invention. In one or more embodiments of the invention, one or more of the steps shown in FIG. 2B may be omitted, repeated, and/or performed in a different order. Accordingly, embodiments of the invention should not be considered limited to the specific arrangements of steps shown in FIG. 2B. In one or more embodiments, the method described in reference to FIG. 2B may be practiced using the system (100) described in reference to FIG. 1 above.

Generally, the method depicted in FIG. 2B may be used to assist garbage collection performed on a memory heap, such as one or more of the memory heaps depicted in FIG. 1 above. In one or more embodiments, the method depicted in FIG. 2B may be used to automatically manage memory for class metadata items describing class types with instances allocated in a garbage collected heap of a managed runtime. The managed runtime refers to a platform that abstracts away the specifics of the operating system and the underlying architecture. In one or more embodiments, the managed runtime may be a JVM implementation, and in particular, MVM. In one or more embodiments, class types identified by the managed runtime to have a same lifetime are associated with a linkset. The method steps described below is from the point of the managed runtime.

Initially, in Step 211, a first linkset is created to identify a first set of coterminous class types defined by a first class loader. This first linkset is typically associated with class types required to bootsrap the managed runtime. For example, a JVM typically creates at JVM startup linkset for all class types defined by the boot class loader.

As described in reference to FIG. 2A above, a linkset graph is used to assist a garbage collection tracing algorithm. In one or more embodiments, the linkset graph is generated by first adding a first node representing a first linkset associated with the first class loader, and initializing a visited flag of the first linkset to a false state. The first linkset is initialized with an empty set of successors in the linkset graph. In other words, the linkset graph is initialized with a single node and has no edge. A first metaspace is also created to store class metadata items that represent the coterminous class types identified by the first linkset. The linkset is recorded in a list that keeps track of all the linksets.

Further, the visited flag is set to a true state by the garbage collection tracing algorithm if the first linkset is visited during tracing. If the visited flag remains in the false state upon completing an iteration of the tracing algorithm, the first linkset is removed from the list of all linksets and memory locations associated with the first linkset is reclaimed together as a group by the garbage collector.

In Step 212, a determination is made as to whether a new set of coterminous type is identified. If this is the case, the method proceeds to Step 213, otherwise it proceeds to step 214. For example, in the Java™ programming language, each class loader used for resolving classes identifies a set of coterminous type. When the JVM™ detects such a class loader for the first time, it effectively identifies a new set of class type and proceeds to Step 213.

In Step 213, a new linkset is created similarly to Step 211. This adds a node without any edge to the linkset graph. The method then proceeds to Step 214.

In Step 214, the managed runtime may be requested to define a new class type coterminous with class types identified by a previously created linkset. If this is the case, the method proceeds to Step 215, otherwise, it proceeds to Step 216.

In Step 215, the managed runtime allocates class metadata items associated with the new class type into the metaspace associated with the linkset that identifies the coterminous types of the new class type. Class metadata items that may hold reference to the heap are appended to a list of heap reference holders maintained by the metaspace.

In one or more embodiments, a list of reference holders in the metaspace is maintained to assist garbage collection tracing algorithm. Specifically, each reference holder in the list is a class metadata item in the metaspace and includes a reference to the memory heap. Such class metadata item in the list may be a class descriptor. For example, in a JVM implementation, the class descriptor for the new class type may hold the reference to the heap allocated instance of java.lang.Class for the new class type. It is therefore appended to the list of heap reference holders of the metaspace where the class descriptor is allocated.

In one or more embodiments, instances of the new class type can be allocated in heap memory. Allocating an instance of the new class type (i.e., an object whose type is the new class type) in the heap includes storing in the header of the instance the class descriptor for the class type.

After allocating the class metadata items and updating the heap reference holders list, the method then proceeds to Step 216.

In Step 216, the managed runtime may be requested to resolve a symbolic reference from a class metadata item representing part of a first class type to a second class metadata items representing part of a second class type. If this is the case, the managed runtime proceeds to Step 217, otherwise, it proceeds to Step 218.

In Step 217, the managed runtime resolve the symbolic reference from the first class type to a pointer to a class metadata item of the second class type. If the linkset identifying the coterminous types of the second class type is different from the linkset identifying the coterminous types of the first class type, an edge from the linkset of the first class type to the linkset of the second class type is added in the linkset graph. In other words, the linkset of the second class type is added to the set of successors of the linkset of the first class type if it isn't already in it. The method then proceeds to Step 218.

In Step 218, the managed runtime may perform garbage collection, in which case the method proceeds to Step 219, otherwise it proceeds to Step 220.

In Step 219, a garbage collection is performed to reclaim heap memory. The garbage collector identifies live heap objects using a conventional garbage collection tracing algorithm, modified to use both the linkset graph and the metaspace list of heap reference holders. The linkset graph is used to determine the liveness of class types that aren't directly reachable from heap objects. The list of heap reference holders of metaspace associated to linksets identifying live coterminous class types is used to identify heap objects reachable from live class metadata items.

As noted above, the linkset graph is used to assist the garbage collection tracing algorithm. In one or more embodiments, the tracing algorithm locate linksets to visit from a grey object in the memory heap in (i) the class descriptor stored in the header of the grey objects, (ii) from a linkset identifier field if the grey object represents a class loader (e.g., in the Java programming language, an instance of the java.lang.ClassLoader), and (iii) from the class descriptor whose reference is stored in a class descriptor field of the object if the object represents a class type (e.g., in the Java programming language, an instance of the java.lang.Class). In one or more embodiments, visiting a linkset in the linkset graph includes: (i) tracing a reference in the list of reference holders stored in the metaspace of the linkset to visit an object in the memory heap, (ii) visit the unvisited linksets in the set of successors of the linkset in the linkset graph, wherein the unvisited linksets have their visited flags set to false.

When the garbage collection tracing algorithm is completed, linksets that were not identified live are removed from the linkset graph, and the memory location corresponding to their metaspace is reclaimed as a group. The method then proceeds to Step 220 where the method either terminates or continues executing the program by returning to Step 212.

An example of applying the method depicted in FIG. 2A, in particular using the linkset graph as described above, to assist the garbage collection tracing algorithm is described in reference to FIG. 4 below.

Figure 3:
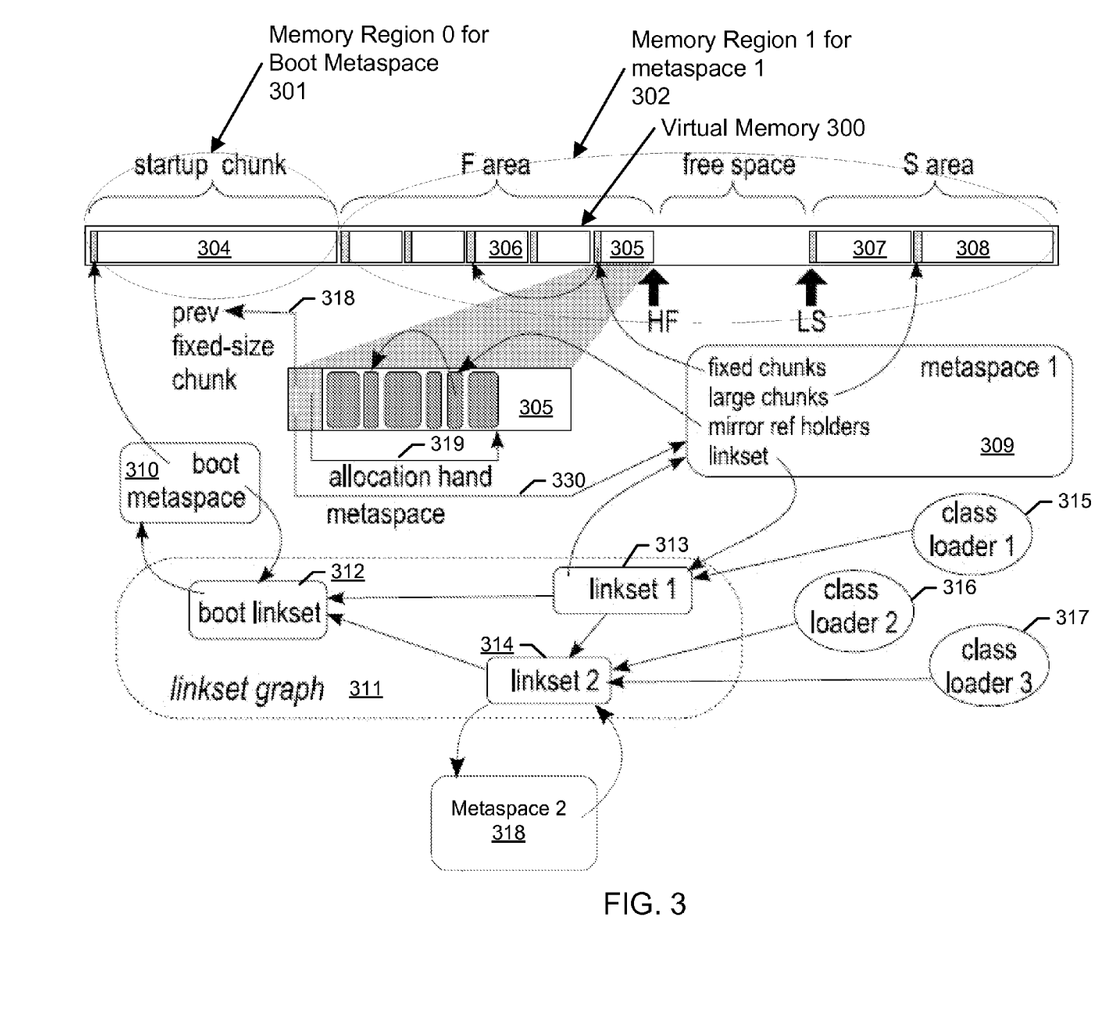
FIGS. 3 and 4 show an example in accordance with one or more embodiments of the invention.

FIG. 3 shows an example of metaspaces in accordance with one or more embodiments of the invention. In particular, FIG. 3 shows the implementation of metaspaces and their relationship to class loaders and linksets. In one or more embodiments of the invention, one or more of the modules and elements shown in FIG. 3 may be omitted, repeated, and/or substituted. Accordingly, embodiments of the invention should not be considered limited to the specific arrangements of modules shown in FIG. 3. In one or more embodiments, the example described in FIG. 3 may be used in the system am method depicted in FIGS. 1 and 2 above.

As shown, the boot metaspace (310), metaspace 1 (309) and metaspace 2 (318) are associated with boot linkset (312), linkset 1 (313), and linkset 2 (314), respectively, forming the linkset graph (311). In one or more embodiments, the aforementioned MVM is extended with the metaspaces and linkset graph depicted in FIG. 3. Details of the modules in FIG. 3 are described below.

In one or more embodiments, a linkset (e.g., boot linkset (312)) is created with a metaspace (e.g., boot metaspace (310)) and both reference each other. For example, on JVM startup, the boot metaspace (310) is created for the boot linkset (312) used by the boot loader (not shown). As noted above, metadata for a class are allocated in the metaspace (e.g., metaspace 1 (309)) associated with that class's defining loader (e.g., class loader 1 (315)). Generally, class metadata allocations happen only at a few well-known places in the JVM. Namely, when a class type is defined from its class file, or when a new array type is defined. The remaining allocations are performed at VM startup time. Accordingly, metadata are either allocated in the metaspace (e.g., metaspace 1 (309)) associated with the defining class loader (e.g., class loader 1 (315)), or allocated in the boot metaspace (310) during the startup phase.

In one or more embodiments, metaspaces (e.g., metaspace 1 (309)) allocate space from fixed-size memory chunks (e.g., chunk (305), chunk (306)) that are supplied on demand by a metaspace chunk allocator (not shown) from the contiguous range of virtual memory (300). If a metadata object (not shown) does not fit in a fixed-size chunk (e.g., chunk (305), chunk (306)) it is allocated by the chunk allocator a custom-size single-object chunk e.g., chunk (307), chunk (308)). In one or more embodiments, the single contiguous range of virtual memory (300) is reserved when the managed runtime (e.g., a JVM or MVM) is starting up, and divided into two memory regions: memory region 0 (301) located at the beginning of the contiguous range of virtual memory (300) comprises a single startup chunk (304); memory region 1 (302), adjacent to memory region 0 (301), is further laid out in three areas: a fixed-size chunks area (or F area) starts at the beginning of memory region 1 (302) and ends at the HF pointer; a single-object chunks area (or S area) starts at the LS pointer and ends at the end of memory region 1 (302). The area of memory region 1 (302) between the HF and the LS pointers is free space that may be used to extend the F and S areas as needed. In one or more embodiments, the F area is used by a fixed-size chunk allocator that allocates fixed-size chunks to any metaspace, including the boot metaspace; similarly, the S area is used by another allocator to allocate chunks of arbitrary size to any metaspace, including the boot metaspace. As shown in FIG. 3, the fixed-size chunks (305) and (306) from the F area and the variable size chunk (308) from the S area are allocated to metaspace 1 (309).

In one or more embodiments, metaspaces are created empty, i.e., without any chunks, except for the boot metaspace (310), which is initialized with a large startup chunk. In an example, 1.5 Mb of class metadata are allocated by the boot loader (not shown) before any other class loader (e.g., class loader 1 (315)) is created. Initializing the boot metaspace (310) with a large startup chunk helps limit intra-chunk fragmentation.

In one or more embodiments, metaspaces keep track of their chunks in two linked lists, one for the fixed-size chunks in the F area, and the other for the large single-object chunks in the S area. For example, the metaspace 1 (309) (or more precisely, the descriptor of metaspace 1 (309)) includes the two head of the chunk linked list referred to as "fixed chunks" and "large chunks". Every chunk begins with a small header that contains a reference (e.g., link (330)) to its containing metaspace (e.g., metaspace 1 (309)), the size of the chunk, and a link (e.g., link (318)) to the next chunk in its list. In addition, fixed-size chunks (e.g., chunk (305)) carry the allocation hand (e.g., allocation hand (319)) of a bump-pointer allocator (not shown). The startup chunk is formatted as a fixed-size chunk.

In one or more embodiments, metadata objects are allocated in the most recently created fixed-size chunk, at the head of the metaspace's list of fixed-size chunks (e.g., fixed-size chunk (305) for metaspace (301)). Allocation just consist of atomically increasing the allocation hand (e.g., allocation hand 319) by the requested amount. If there isn't enough space left in this chunk to accommodate the object, a new fixed-size chunk is allocated and added as the new head of the list, unless the object is larger than some pre-determined threshold, in which case it is allocated in a single-object chunk.sln one or more embodiments, fixed-sized chunks are sized to a multiple of virtual memory pages and are aligned to page boundaries. Accordingly, this alignment together with the layout of the contiguous range of virtual memory (300) into F and S areas allows fast retrieval of the metaspace of any metadata object using simple pointer arithmetic on its reference. This layout also enables fine-grained control over memory footprint: pages of a free fixed-size chunk can be mapped and unmapped as needed to satisfy footprint constraints. A simple bit vector (not shown) is used to track which chunk is free and whether its pages are currently mapped to physical memory.

Fixed-size chunks are allocated from unused chunks in their area, using the bit vector mentioned above. When this task fails, the F area is extended. Single-object chunks are allocated from the top of the S area in decreasing address order. Free single-object chunks are tracked in a free list. Allocating a single-object chunk performs a first fit search of the free list. When this task fails, the LS limit is moved down further to satisfy the allocation request.

Further as shown in FIG. 3, the linkset graph (311) summarizes how class loaders (e.g., class loader 1 (315)) reference each other through resolved symbolic links. In one or more embodiments, the linkset graph (311) is built incrementally, when symbolic links to classes are resolved. Building the linkset graph needs to be performed only on two occasions: at creation of a class type T from a class file, when resolving T's superclass and super-interfaces; and when resolving a class entry in T's constant pool. In both cases, if the resolved class type R is not defined by T's class loader, the linkset of R's defining loader is added to the set of successors of T's linkset. For example, the set of successors may be implemented as a tiny hash-table.

In one or more embodiments, defining a new class type by a class loader includes (i) allocating the metadata describing the class type in a metaspace of a linkset associated with the class loader, (ii) allocating, in the application heap, the mirror of the new class type, and (iii) adding the class descriptor of the new class type, which hold the reference to the mirror of the new class type, in the list of mirror reference holder of the metaspace. An example class type and associated structure are described in reference to FIG. 4 below.

Figure 4:
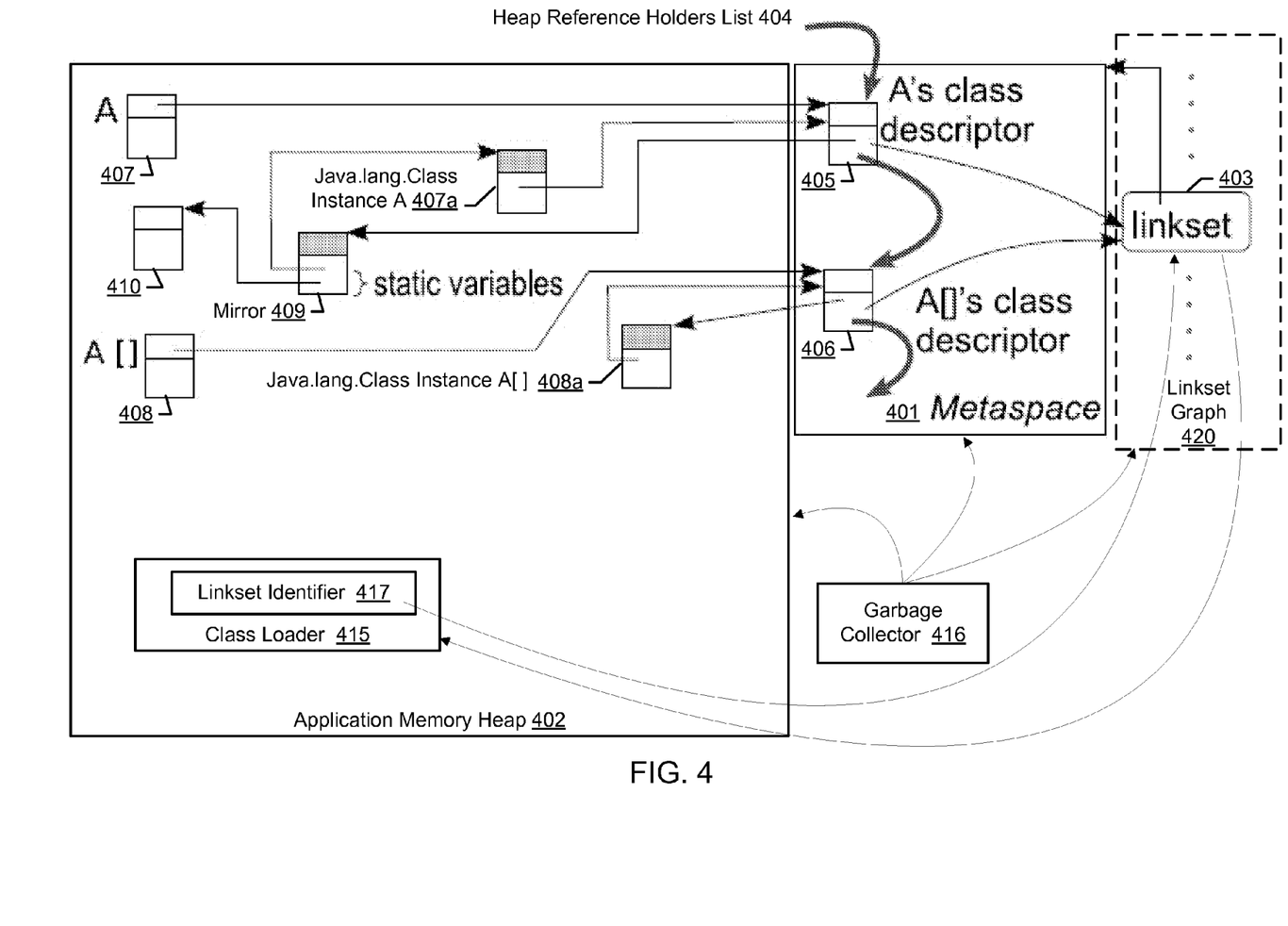

FIG. 4 shows an example of metaspace allocated class metadata and memory heap allocated objects in accordance with one or more embodiments of the invention. In particular, FIG. 4 shows the details of objects and the relationships between class metadata allocated in one metaspace and reference from class metadata to memory heap allocated objects. Further, it describes a list of heap reference holders maintained by a metaspace to keep track of references from class metadata to the heap.

In one or more embodiments of the invention, one or more of the modules and elements shown in FIG. 4 may be omitted, repeated, and/or substituted. Accordingly, embodiments of the invention should not be considered limited to the specific arrangements of modules shown in FIG. 4. In one or more embodiments, the example described in FIG. 4 may be based on the metaspace example depicted in FIG. 3 and used in the system and method depicted in FIGS. 1, 2A, and 2B above.

As shown in FIG. 4, the application memory heap (402), metaspace (401), linkset (403), linkset graph (420), and garbage collector (416) may be essentially the same as the memory heap 1 (151), metaspace L1 (111), linkset L1 (103), linkset graph (102), and garbage collector (101) respectively, described in reference to FIG. 1 above. In this example, the application memory heap (402) includes object A (407) (an instance of class A), array A[ ] (408) (an instance of class A[ ]), object (410), java.lang.Class instance A (407a) (the java.lang.Class instance representing the class A), java.lang.Class instance A[ ] (408a) (the java.lang.Class instance representing the class A[ ]), and mirror (409) for class A. In particular, A and A[ ], the classes of object A (407) and array A[ ] (408), respectively, are defined by the same class loader (415) of linkset (403). Accordingly, class descriptors (405) and (406) of classes A and A[ ] are allocated in metaspace (401) paired with linkset (403) of class loader (415). Class loader (415) is represented as a standard heap allocated object, whose class is a sub class of the class java.lang.ClassLoader. Further, class descriptors (405) and (406) are included in a heap reference holders list (404) of the metaspace (401) since they comprise, respectively, references to mirror 409 and instance of java.lang.Class A (408a), which are objects allocated in the application memory heap (402).

In an alternative configuration, the instance of java.lang.Class A (407a) representing class A may replace the mirror (409) as the mirror for class A and is pointed to directly from the descriptor (405). In this alternative configuration, the information stored in the mirror (409), such as the static variables of class A, are stored directly in the instance of java.lang.Class A (407a), and the mirrors for all classes are simply instances of java.lang.Class.

In one or more embodiments, class mirror (409) holds the class-loader-specific part of class metadata (e.g., class descriptor (405)), which includes a reference to the java.lang.Class instance A (407a) for class A. Generally, there is only one reference to a mirror (e.g., mirror (409)) per class (e.g., class A). That single reference is stored in the class's class descriptor (e.g., class descriptor (405)), or in a task table (not shown) if the class descriptor can be shared across tasks (i.e., when multitasking is enabled). Such class descriptor (e.g., class descriptor (405)) or task table storing the reference to the mirror (e g., mirror (409)) is referred to as a heap reference holder or a mirror reference holder. As shown in FIG. 4, all mirror reference holders within the metaspace (401) are linked together by the heap reference holders list (404). In one or more embodiments, class mirrors are created at class definition time by the JVM. If the garbage collector (416) implements generational garbage collection, class mirrors may further be allocated directly in the old generation. Array classes (e.g., A[ ]) reference their java.lang.Class instance (e.g., java.lang.Class instance A[ ] (408a) for class A[ ]) directly from their descriptor (e.g., array class descriptor (406)) without using a mirror, since it is their only class-loader-specific part.

In one or more embodiments, the only references from the metaspace (401) to the application memory heap (402) are from metadata objects that are in the heap reference holder list (404). This includes references from class descriptor (e.g., class descriptor (405) of object A (407)) and array class descriptor (e.g., class descriptor (406) of array object A[ ] (408)) to class mirrors (e g., mirror (409)) and to instances of java.lang.Class representing array classes (e.g., instance of java.lang.Class A[ ] (408a)).

In one or more embodiments, garbage collections of the application memory heap (402) use the linkset graph (420) and the heap reference holders list (404) of the corresponding metaspace (401) to avoid expensive tracing of class metadata.

The tracing of live objects by the garbage collector (416) begins with marking all roots (not shown) grey. This includes tracing all memory heap references in the boot metaspace (e.g., boot metaspace (310) depicted in FIG. 3), simply by iterating over its list of heap reference holders. For example, metaspace (401) and heap reference holders list (404) may represent the boot metaspace and its associated list of mirror reference holders. In another example, metaspace (401) and heap reference holders list (404) may represent the other metaspace (e.g., metaspace 1 (309)) depicted in FIG. 3 and its associated list of mirror reference holders. When reaching a grey object (e.g., object A (407)), the garbage collector visits its references to mark grey those yet unmarked. The key difference between marking with or without metaspaces (e.g., metaspace (401)) is how the header of grey objects (e.g., object A (407)) is processed, and how grey instances of subclasses of java.lang.ClassLoader (e.g., class loader object (415)) are treated. When visiting the header of a grey object, the tracing algorithm in the prior art processes the field where the class descriptor's reference is stored like any other reference within that object. That is, the class descriptor is marked grey. This causes the algorithm to trace the graph of metadata objects rooted by the class descriptor. In the prior art methods, the tracing algorithm doesn't use a linkset graph (e.g., linkset graph (420)) while metadata objects may be stored in the memory region other than the metaspace (401), e.g., in a permanent generation, or directly in the application heap. In this case, such metadata object is visited by the tracing algorithm to find references to other metadata objects or heap allocated application objects.

The tracing algorithm used by garbage collector (416) is based on the metaspace (401) and linkset graph (420) described above and replaces the prior art tracing of the class metadata graph rooted in the object header with a traversal of the linkset graph (420). In other words, instead of marking the class descriptor (405) grey, the garbage collector (416) visits the linkset (403) of the metaspace (401) where the class descriptor (405) is stored. The linkset (403) may be found from the class loader (415) which is typically referenced from the class descriptor (405) of the visited grey object A (407). Visiting the linkset (403) consists of marking the class loader object (415) associated with the linkset (403), iterating over the heap reference holders list (404) of the linkset's metaspace (401), and visiting successors of the linkset (403) in the linkset graph (420). Every linkset has a visited flag (not shown) that the garbage collector (416) uses to prevent multiple traversals of linksets during tracing, and to identify unreachable linksets afterwards.

A linkset may not be reachable from other visited linksets via the linkset graph (403), or from memory heap objects (e.g., object A (407)) via their class descriptor (e.g., class descriptor (405)) stored in their header. Yet, the class loader object (415) associated with the linkset (403) may be alive, and therefore the classes it defines too. In order to protect against unloading in this case, visiting a grey class loader object (e.g., class loader (415)) includes an extra step to visit its linkset (403), found using the linkset identifier (e.g., linkset identifier (417)) stored in the class loader object (e.g., class loader (415)).

When tracing is complete, the garbage collector (416) can determine what classes to unload simply by iterating over the current task's list of linksets. If the visited flag of a linkset (e.g., linkset (403)) is not set, its metaspace (e.g., metaspace (401)) is freed with memory location reclaimed and the linkset (403) is removed from the task's list of linksets. Otherwise, the visited flag is cleared.

Figure 5:
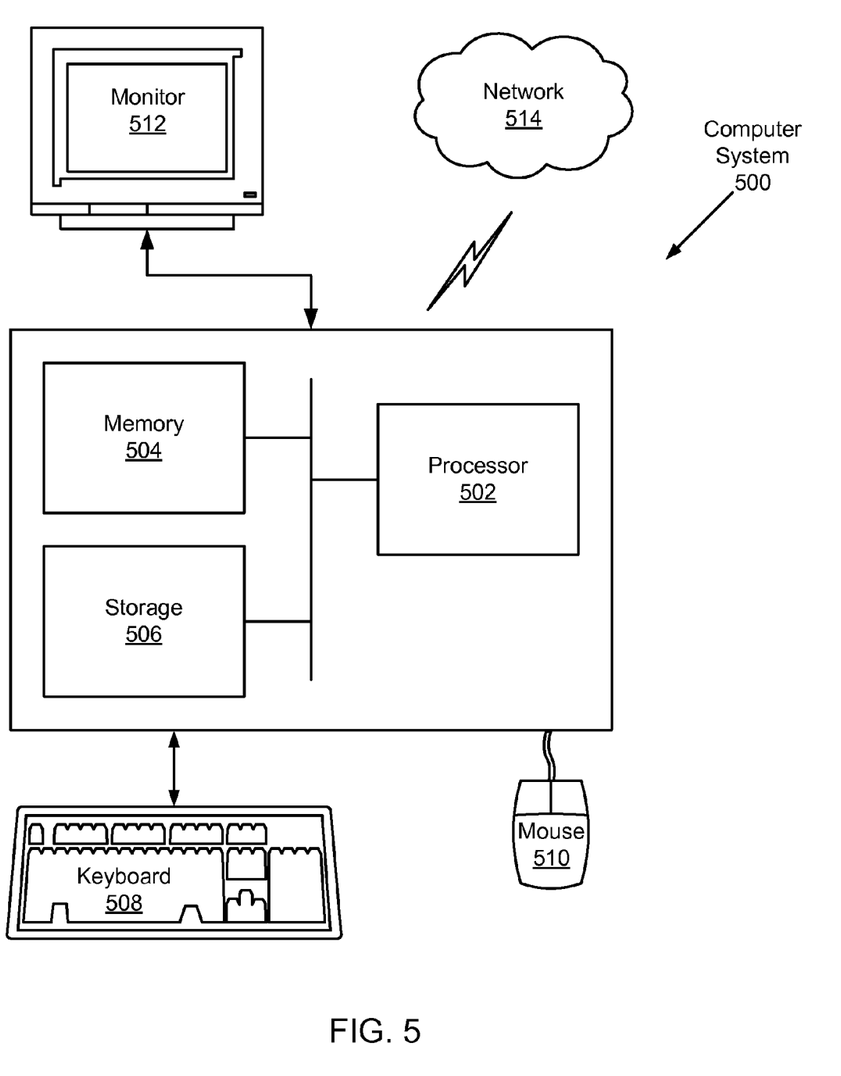
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (514) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., directories in directory structure, file system engine, file system, active document, index, etc.) may be located on a different node within the distributed system. In one embodiment of the invention, the node corresponds to a computer system. Alternatively, the node may correspond to a processor with associated physical memory. The node may alternatively correspond to a processor with shared memory and resources. Further, software instructions to perform embodiments of the invention may be stored on a computer readable medium such as a compact disc (CD), a diskette, a tape, a file, or any other computer readable storage device.

It will be understood from the foregoing description that various modifications and changes may be made in the preferred and alternative embodiments of the present invention without departing from its true spirit. For example, the method may be performed in a different sequence, method steps may be performed by different components, the components provided may be integrated or separate, the devices included herein may be manually and/or automatically activated to perform the desired operation. The activation may be performed as desired and/or based on data generated, conditions detected and/or analysis of results from the application.

While the invention has been described with respect to a limited number of embodiments and advantages, those skilled in the art, having benefit of this disclosure, will appreciate that other embodiments and advantages can be devised which do not depart from the scope of the invention as disclosed herein. Accordingly, the scope of the invention should be limited only by the attached claims.

What is claimed is:

1. A method for managing class metadata in a garbage collected system, comprising:
   allocating a first metaspace to a first class loader of a mutator executing on a processor using a memory heap, wherein the first metaspace is configured to store a first plurality of class metadata items generated by the first class loader;
   storing, in the first metaspace, a first plurality of class metadata items associated with a first plurality of classes defined by the first class loader,
      wherein the first plurality of class metadata items and the first class loader are coterminous, and
      wherein all of the first plurality of class metadata items are identified by a garbage collector as live if any of the first plurality of class metadata items is reachable by the mutator; and
   reclaiming, by the garbage collector executing on the processor based on a pre-determined algorithm using the first metaspace, a plurality of memory locations unreachable by the mutator, wherein all of the plurality of memory locations allocated to the first plurality of class metadata items are reclaimed together as a group, wherein the pre-determined algorithm comprises generating a linkset graph by:
      adding, to the linkset graph, a first node representing a first linkset associated with the first class loader, wherein the first linkset identifies the first plurality of classes;
      adding, to the linkset graph, a second node representing a second linkset associated with a second class loader, wherein the second linkset identifies a second plurality of classes defined in the memory heap by the second class loader;
      adding, to the linkset graph, a directed edge between the first node and the second node in response to resolving at least one symbolic reference from the first plurality of classes to the second plurality of classes;
      initializing a visited flag of the first linkset to a false state; and
      performing a tracing algorithm, comprising:
         if the visited flag is in the false state, setting the visited flag to a true state and visiting the first linkset;
         testing, upon completing an iteration of the tracing algorithm, whether the visited flag is in the false state, wherein all of the plurality of memory locations allocated to the first plurality of class metadata items are reclaimed together as a group if the visited flag is in the false state; and
         resetting the visited flag to the false state if the visited flag is in the true state.

2. The method of claim 1, wherein performing the tracing algorithm further comprises:

retrieving a second reference from a first object in the memory heap, wherein the second reference references at least one selected from a group consisting of the first linkset and one of the first plurality of class metadata items having a third reference referencing the first linkset, wherein the first linkset is visited based on the second reference.

3. The method of claim 2, wherein visiting the first linkset comprises following the directed edge in the linkset graph from the first linkset to visit the second linkset.

4. The method of claim 2, wherein visiting the first linkset further comprises:

identifying, from the first plurality of class metadata items, a list of reference holders associated with the first linkset, wherein each reference holder in the list is a first class metadata item comprising a first reference to a second object in the memory heap; and tracing the second object in the memory heap based on the first reference.

5. The method of claim 2, wherein the second reference is retrieved from a header field in the first object, and wherein the second reference references the one of the first plurality of class metadata items having the third reference referencing the first linkset.

6. The method of claim 2, wherein the first object in the memory heap comprises an instance of a sub-class of java.lang.ClassLoader, and wherein the second reference references the first linkset.

7. The method of claim 4, wherein the second object in the memory heap is a class mirror of one of the first plurality of classes defined by the first class loader, and wherein the class mirror comprises a static variable of the one of the first plurality of classes.

8. A system comprising:

a processor;

a memory heap within which memory locations unreachable by a mutator executing on the processor using the memory heap are reclaimed by a garbage collector; and a first metaspace allocated to a first class loader of the mutator, wherein the first metaspace is configured to store a first plurality of class metadata items generated by the first class loader, wherein the first plurality of class metadata items and the first class loader are coterminous, wherein all of the first plurality of class metadata items are identified by a garbage collector as live if any of the first plurality of class metadata items is reachable by the mutator, wherein the garbage collector executes on the processor and is configured to reclaim, based on a pre-determined algorithm using the first metaspace, a plurality of memory locations unreachable by the mutator, wherein all of the plurality of memory locations allocated to the first plurality of class metadata items are reclaimed together as a group, and wherein the pre-determined algorithm comprises generating a linkset graph by:

adding, to the linkset graph, a first node representing a first linkset associated with the first class loader, wherein the first linkset identifies the first plurality of classes;

adding, to the linkset graph, a second node representing a second linkset associated with a second class loader, wherein the second linkset identifies a second plurality of classes defined in the memory heap by the second class loader; and adding, to the linkset graph, a directed edge between the first node and the second node in response to resolving at least one symbolic reference from the first plurality of classes to the second plurality of classes;

initializing a visited flag of the first linkset to a false state; and performing a tracing algorithm, comprising:

if the visited flag is in the false state, setting the visited flag to a true state and visiting the first linkset;

testing, upon completing an iteration of the tracing algorithm, whether the visited flag is in the false state, wherein all of the plurality of memory locations allocated to the first plurality of class metadata items are reclaimed together as a group if the visited flag is in the false state; and resetting the visited flag to the false state if the visited flag is in the true state.

9. The system of claim 8, wherein performing the tracing algorithm further comprises:

retrieving a second reference from a first object in the memory heap, wherein the second reference references at least one selected from a group consisting of the first linkset and one of the first plurality of class metadata items having a third reference referencing the first linkset, wherein the first linkset is visited based on the second reference.

10. The system of claim 9, wherein visiting the first linkset comprises following the directed edge in the linkset graph from the first linkset to visit the second linkset.

11. The system of claim 9, wherein visiting the first linkset further comprises:

identifying, from the first plurality of class metadata items, a list of reference holders associated with the first linkset, wherein each reference holder in the list is a first class metadata item comprising a first reference to a second object in the memory heap; and tracing the second object in the memory heap based on the first reference.

12. The system of claim 9, wherein the second reference is retrieved from a header field in the first object, and wherein the second reference references the one of the first plurality of class metadata items having the third reference referencing the first linkset.

13. The system of claim 9, wherein the first object in the memory heap comprises an instance of a sub-class of java.lang.ClassLoader, and wherein the second reference references the first linkset.

14. The system of claim 11, wherein the second object in the memory heap is a class mirror of one of the first plurality of classes defined by the first class loader, and wherein the class mirror comprises a static variable of the one of the first plurality of classes.

15. A non-transitory computer readable medium, embodying instructions executable by a processor to perform method steps for managing class metada data in a garbage collected system, the instructions comprising functionality to:

allocate a first metaspace to a first class loader of a mutator executing on a processor using a memory heap, wherein the first metaspace is configured to store the class metadata generated by the first class loader;

store, in the first metaspace, a first plurality of class metadata items associated with a first plurality of classes defined by the first class loader,
  wherein the first plurality of class metadata items and the first class loader are coterminous, and
  wherein all of the first plurality of class metadata items are identified by a garbage collector as live if any of the first plurality of class metadata items is reachable by the mutator; and
reclaim, by the garbage collector executing on the processor based on a pre-determined algorithm using the first metaspace, a plurality of memory locations unreachable by the mutator, wherein all of the plurality of memory locations allocated to the first plurality of class metadata items are reclaimed together as a group,
wherein the pre-determined algorithm comprises generating a linkset graph by:
  adding, to the linkset graph, a first node representing a first linkset associated with the first class loader, wherein the first linkset identifies the first plurality of classes;
  adding, to the linkset graph, a second node representing a second linkset associated with a second class loader, wherein the second linkset identifies a second plurality of classes defined in the memory heap by the second class loader; and
  adding, to the linkset graph, a directed edge between the first node and the second node in response to resolving at least one symbolic reference from the first plurality of classes to the second plurality of classes;
  initializing a visited flag of the first linkset to a false state; and
  performing a tracing algorithm, comprising:
    if the visited flag is in the false state, setting the visited flag to a true state and visiting the first linkset;
    testing, upon completing an iteration of the tracing algorithm, whether the visited flag is in the false state, wherein all of the plurality of memory locations allocated to the first plurality of class metadata items are reclaimed together as a group if the visited flag is in the false state; and
    resetting the visited flag to the false state if the visited flag is in the true state.

16. The non-transitory computer readable medium of claim 15, wherein the pre-determined algorithm comprises:
  retrieving a second reference from a first object in the memory heap,
  wherein the second reference references at least one selected from a group consisting of the first linkset and one of the first plurality of class metadata items having a third reference referencing the first linkset,
  wherein the first linkset is visited based on the second reference, and
  wherein visiting the first linkset comprises following the directed edge in the linkset graph from the first linkset to visit the second linkset.

* * * * *

UNITED STATES PATENT AND TRADEMARK OFFICE
CERTIFICATE OF CORRECTION

PATENT NO. : 9,116,798 B2  
APPLICATION NO. : 13/308380  
DATED : August 25, 2015  
INVENTOR(S) : Daynes et al.

Page 1 of 1

It is certified that error appears in the above-identified patent and that said Letters Patent is hereby corrected as shown below:

Title Page

Column 2, under other publications, line 9, delete "Colletor" and insert -- Collector --, therefor.

Column 2, under abstract, line 11, delete "sumarize" and insert -- summarize --, therefor.

Drawings

On sheet 2 of 6, in FIG. 2A, under Reference Numeral 205, line 3, delete "medata data" and insert -- metadata --, therefor.

Specification

In column 5, line 60, delete "loader" and insert -- loader. --, therefor.

In column 8, line 10, delete "refererences" and insert -- references --, therefor.

In column 9, line 24, delete "bootsrap" and insert -- bootstrap --, therefor.

In column 18, line 62, in claim 15, delete "metada data" and insert -- metadata --, therefor.

Signed and Sealed this  
Twenty-first Day of June, 2016

Michelle K. Lee  
*Director of the United States Patent and Trademark Office*